March 18, 1969 D. P. CAPRIOLI 3,432,871
SCRAPER
Filed June 5, 1967
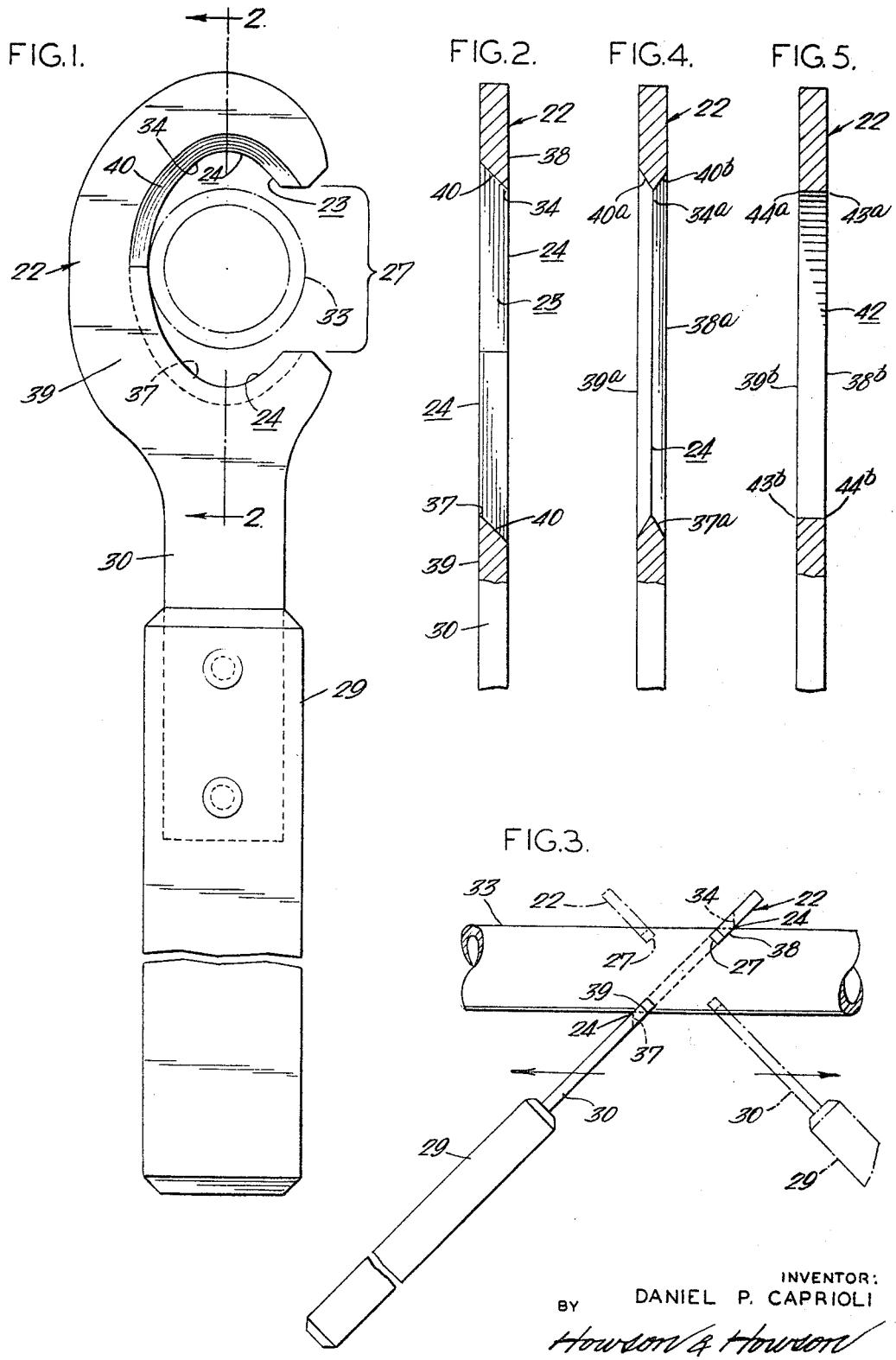
INVENTOR:
DANIEL P. CAPRIOLI
BY Howson & Howson
ATTYS.

United States Patent Office 3,432,871
Patented Mar. 18, 1969

3,432,871
SCRAPER
Daniel P. Caprioli, P.O. Box 792,
Devon, Pa. 19333
Filed June 5, 1967, Ser. No. 643,604
U.S. Cl. 15—104.04
Int. Cl. F28g *1/08;* B08b *9/02*
4 Claims

ABSTRACT OF THE DISCLOSURE

A hand operated scraper for removing paint, rust, scale and similar material from the outer surface of an elongated workpiece having uniform cross-section. The scraper has a body with an aperture therein to circumscribe the workpiece and a scraping edge around the aperture to engage the workpiece surface in scraping relationship. The scraper acts as a lever upon the workpiece, and in operation as it is moved along the workpiece, part of the effort exerted by the operator to the scraper is used to create, through leverage action, the shearing force between the scraping edge and the workpiece to scrape the material away.

Background of the invention

The present invention is an improvement in scraping devices and has particular application to scrapers used for scraping paint, rust, scale and similar material from an elongated workpiece having uniform cross-section.

Prior scrapers had many difficulties. A primary difficulty of the prior scrapers occurred in creating sufficient shearing forces between the scraping edge and the surface of the workpiece to clean the material therefrom.

Another disadvantage of prior scrapers was their cost. Some scrapers, particularly the scrapers using mechanical means to create the shearing force, were constructed of many parts which made the scraper expensive to manufacture and, of course, purchase.

Other scrapers had limitations in that their use was limited to cleaning workpiece surfaces which were in the immediate vicinity of the operator. For instance, where the workpiece was located beyond the reach above the operator, complicated and expensive scaffolding or other devices to support the operator in close vicinity to the workpiece was necessary. This made the cost of cleaning the workpiece expensive and increased the overall maintenance cost of servicing the workpiece.

With the foregoing in mind a principal object of the present invention is to provide a novel scraping tool to facilitate the easy removal of paint, rust, scale, and other material from the outer surface of an elongated workpiece having uniform cross-section.

Another object of the present invention is to provide a novel scraping tool which will enable an operator to easily create the necessary shearing force between the scraping edge and the workpiece surface.

Still another object of the present invention is to provide a novel scraping tool which has a relatively large scraping surface and which is highly economical to manufacture and as assemble, yet which is fully effective in operation and use.

A further object of the present invention is to provide a novel scraper which uses mechanical leverage to apply the shearing force to the workpiece.

Another object of the present invention is to provide a novel scraping tool which can be efficiently used to clean a workpiece away from the location of the operator of the scraper.

Another object of the present invention is to provide a novel scraper comprising a body having an aperture therein, a scraping edge for substantially circumscribing the aperture and engaging the surface of a workpiece in scraping relation, and a handle fastened at one end of the body, whereby an operator may position the scraper upon the workpiece as a lever to create a shearing force between the scraping edge and the workpiece to remove paint, rust, scale or similar material from the workpiece surface.

Other objects and a fuller understanding of the invention may be had by referring to the following description and claims taken in conjunction with the accompanying drawings wherein:

FIG. 1 is a fragmentary side elevational view of a scraper embodying the present invention;

FIG. 2 is a fragmentary sectional view taken along the line 2—2 of FIG. 1;

FIG. 3 is a fragmentary edge elevational view showing the structure of FIG. 1 in the operating position;

FIG. 4 is a fragmentary sectional view of a modification of the structure as shown in FIG. 1, and similar to FIG. 2;

FIG. 5 is a fragmentary sectional view of another modification of the structure in FIG. 1, and similar to FIG. 2;

The scraper generally comprises a body, a shaped aperture within the body having a scraping edge around its circumference, and a handle connected to the body to place the body in a working position whereby the scraping edge circumscribes a longitudinally extending uniform cross-section workpiece to engage its outer surface in scraping relation. In the working position the scraper is moved reciprocally upon the workpiece by effort applied by an operator to the handle. A portion of the operator's effort is directed through leverage action to create a shearing force between the scraping edge and the surface of the workpiece to thereby remove paint, rust scale and like material from the workpiece surface.

More specifically, as shown in FIGS. 1 through 3, the scraper is hand operated and in this case has a C-shaped body 22 with a shaped aperture 23 formed in the center thereof. A scraping edge 24 circumscribes the aperture 23 and a passage 27 in the body permits a workpiece 33 to be received in the aperture 23 for engagement with the scraping edge. A neck 30 is provided at one end of the body and a handle 29 is connected thereto.

In accordance with the invention, to provide the shearing force between the scraping edge 24 and the surface of the workpiece 33, the scraper is used as a lever about the workpiece whereby part of the scraping effort applied by the operator to the handle 29 is directed by leverage to urge the scraping edge against the workpiece surface.

In order for the scraper to obtain leverage action on the workpiece the shaped aperture 23 has an elongated profile of the workpiece cross-section. In the working position as shown in FIG. 3, the body 22 is inclined toward the longitudinal axis of the workpiece, and an upper or first scraping portion 34 of the scraping edge engages one side of the workpiece and a lower or second scraping portion 37 of the scraping edge engages the other side of the workpiece. By forcing the handle 29 toward the workpiece's longitudinal axis a couple is created between the two portions which forces them against the workpiece's outer surface. As the scraper is moved longitudinally along the workpiece the couple supplies the shearing force for removing the material from the workpiece surface. By varying the force on the handle toward the workpiece, the resulting shearing force at the scraping edge may be varied.

In the present case as shown in FIG. 1, the shaped aperture 23 is elliptical and dimensioned to embrace a circular cross-sectioned workpiece such as a pipe 33. To this end and to allow the elliptical aperture to create the coupling moment on the pipe, the minor axis dimension (length) of the ellipse is at least equal to the diameter of the pipe and the major axis is sufficiently greater than the pipe diameter to allow the scraper to be inclined at an acute angle with respect to the longitudinal axis of the pipe which will allow the operator's effort on the handle to be principally directed to moving the scraper longitudinally along the pipe while a small portion of the applied force is directed through the leverage action to create the shearing force. In this application and the appended claims the major axis is defined as a straight line extending through the two focal points or foci of the ellipse and the minor axis is defined as a line perpendicular to and through the center of the major axis.

In operation as shown in FIG. 3, the pipe is passed through the passage 27 into the aperture 23, and the scraper is inclined toward the pipe to place it in the working position. The operator using the scraper grasps the handle and moves the scraper reciprocally along the longitudinal axis of the pipe 33. By pressing the handle 29 toward the pipe 33 the operator through the leverage action may increase the shearing force as necessary between the scraping edge 24 and the pipe surface. The operator may thus regulate the shearing force at the scraping edge 24 for different areas of material on the pipe which require different shearing forces for the material removal.

The shape of the aperture is not limited to an ellipse, and the scraper is not limited to scraping a workpiece having a circular cross-section. The aperture may have any other shape which is suitable to circumscribe or embrace any shape workpieces and which will allow the scraping edge through leverage to be forced against the workpiece. The body may for instance be modified to have a lozenge-shaped aperture to circumscribe a workpiece having a square cross-section.

The body may also be modified to accommodate the scraping of several different size and shape cross-sections by having a plurality of shaped apertures therein or the scraper may have more than one body, for instance, one body at each end of the handle to accommodate different workpiece cross-sections.

To engage the outer surface of the workpiece 33 to remove the paint, rust, scale and like material therefrom, the scraping edge 24 is provided. In the present instance as shown in FIGS. 1 and 2, the upper scraping portion 34 of the scraping edge 24 is coplanar with the first side 38 of the body and the lower scraping portion is coplanar with the second side 39 of the body. Each portion is formed by a beveled surface 40 located on the side opposite the coplanar side of the portion.

The scraping edge may be modified as shown in FIGS. 4 and 5. In the scraping edge shown in FIG. 4, both upper and lower scraping portions 34a and 37a respectively of the edge 24 are located in a common plane intermediate the body sides 38a and 39a; and each are formed by two beveled surfaces 40a and 40b disposed on the opposite sides of the body.

In the scraping edge shown in FIG. 5 the aperture is circumscribed by a surface 42 which is perpendicular to the opposite sides of the body 22 to form two sets of scraping edges. Each set has a pair of diagonally opposed scraping portions, 43a, 43b, and 44a, 44b disposed on the opposite sides 38b and 39b of the body and coplanar therewith.

Where the workpiece is located at a distance away from the operator, for instance, where a pipe as located above the position of the operator and away from his immediate reach, the handle 29 of the scraper may be extended or otherwise lengthened to allow the scraping of the pipe from the operator position. Since the scraping edge derives the shearing force through the leverage action and not from an additional force applied by the operator directly to the scraping edge, the shearing force may be applied by the leverage action through a long handle. This feature eliminates the necessity of scaffolding or other means which is usually necessary to support the operator near the workpiece when scraping. The elimination of scaffolding in this instance reduces scraping time and costs.

From the foregoing description it can be seen that the novel scraper of the present invention enables an operator to easily create the necessary shearing force between the scraping edge and the workpiece surface to remove paint, rust, scale, and like material therefrom.

It can also be easily seen that the scraper can effectively scrape a workpiece located away from the location of the operator.

In addition, the scraper of the present invention is highly economical to manufacture and assemble, is fully effective in operation and use, and provides an efficient means of scraping a substantial portion of a workpiece.

While particular embodiments of the present invention have been herein illustrated and described, it is not intended to limit the invention to such disclosures, but changes and modifications may be made therein and thereto within the scope of the following claims.

1. Apparatus for scraping the outer surface of an elongated uniform cross-section workpiece, said apparatus comprising a body, a substantially straight handle member connected to said body, means for defining at least one shaped aperture in said body extending transversely of said handle, said aperture being shaped to define an elongated profile of the cross-section of the workpiece, said means further defining a scraping edge coextensive with at least a part of said aperture and having a first and second scraping portion, said first scraping portion of said scraping edge being coplanar with a first side of said body at one end of said aperture and said second scraping portion of said scraping edge being coplanar with a second side of said body at the other end of said aperture, said first and second scraping portions each being formed by a beveled surface located on the side opposite the coplanar side of said portions, said portions adapted to engage opposite sides of said outer surface of said workpiece in scraping relationship when said body is inclined relative to the longitudinal axis of said workpiece to thereby create a couple between said scraping portions to force said portions against the outer workpiece surface, whereby upon reciprocation of the apparatus relative to the workpiece the outer surface thereof is cleaned.

2. Apparatus according to claim 1, wherein said body is C-shaped and includes means forming a passage to permit a workpiece to be received in said aperture for engagement by said scraping edge.

3. Apparatus according to claim 2, wherein the elongated profile of said shaped aperture is elliptical and dimensioned to embrace a circular cross-section workpiece, the minor axis dimension of said elliptical aperture being at least equal to the diameter of said workpiece, and said major axis dimension being greater than the diameter of said workpiece an amount sufficient to enable inclining of said body at an acute angle with respect to the longitudinal axis of said workpiece.

4. A scraper for the outer surface of a cylindrical workpiece comprising a one-piece C-shaped body having first and second sides disposed in parallel planes, a substantially straight elongated handle member connected to said body with its longitudinal axis disposed parallel to said planes, means defining in said body at least one elliptically shaped aperture having its major axis disposed coaxially with said handle and its minor axis normal thereto, means forming a passage into said aperture along said minor axis for receiving the workpiece within said aperture, said aperture defining means further defining a scraping edge having a first scraping portion extending along said aperture at the end remote from said handle and a second scraping portion extending along said aperture at the diametrically opposite end adjacent said handle, the major axis of said aperture being greater in length than the diameter of the workpiece to be scraped so that said scraper body may be inclined at an angle to the workpiece to engage said diametrically opposed scraping portions with the adjacent surfaces of the workpiece for creating a couple therebetween when the handle is urged toward the workpiece, said first scraping portion having a beveled surface intersecting the first side of said body at an obtuse angle and said second scraping portion having a beveled surface intersecting the second side of said body at an obtuse angle, the beveled surface of said first scraping portion being disposed in a plane substantially normal to the outer surface of said workpiece to face in the direction of scraping movement when the body is inclined and displaced relative to the longitudinal axis of the workpiece, the beveled surface of said second scraping portion being disposed in another plane substantially normal to the outer surface of said workpiece to face in the direction opposite to the direction of scraping movement when the body is inclined and displaced relative to said longitudinal axis, whereby the angle of inclination of the scraper may be varied as it is displaced along the workpiece to adjust the scraping force applied to the surface of the workpiece.

References Cited

UNITED STATES PATENTS

| | | | |
|---|---|---|---|
| 84,587 | 12/1868 | Sloat | 15—104.04 |
| 1,056,050 | 3/1913 | Nyberg | 15—104.04 |
| 2,169,940 | 8/1939 | Bonge | 15—104.04 |
| 2,824,323 | 2/1958 | Tos et al. | 15—236 X |
| 3,280,457 | 10/1966 | Lewis et al. | 30—317 |

FOREIGN PATENTS

| | | |
|---|---|---|
| 699,624 | 12/1940 | Germany. |
| 975,089 | 11/1964 | Great Britain. |
| 689,837 | 4/1953 | Great Britain. |

WALTER A. SCHEEL, *Primary Examiner.*

LEON O. MACHLIN, *Assistant Examiner.*